(12) United States Patent
Huang et al.

(10) Patent No.: US 7,363,037 B2
(45) Date of Patent: Apr. 22, 2008

(54) VERTICAL HANDOVER CONTROL ALGORITHM FOR WLAN AND UMTS

(75) Inventors: Ching Yao Huang, HsinChu (TW); Chie Ming Chou, Taichung (TW)

(73) Assignee: National Chiao Tung University, Hsinchu (TW)

( * ) Notice: Subject to any disclaimer, the term of this patent is extended or adjusted under 35 U.S.C. 154(b) by 350 days.

(21) Appl. No.: 11/259,661

(22) Filed: Oct. 26, 2005

(65) Prior Publication Data

US 2007/0091844 A1  Apr. 26, 2007

(51) Int. Cl.
*H04Q 7/20* (2006.01)
(52) U.S. Cl. ............... 455/436; 455/452.2; 370/331; 370/332
(58) Field of Classification Search ........... 370/252, 370/328, 331, 332, 333; 455/436–444, 452.2, 455/432.1, 453
See application file for complete search history.

(56) References Cited

U.S. PATENT DOCUMENTS 7,096,022 B2 * 8/2006 Gao et al. ............... 455/444
2004/0067754 A1  4/2004 Gao et al.
2004/0076179 A1  4/2004 Kaminski et al.
2006/0029021 A1 * 2/2006 Sakawa et al. ........... 370/331

OTHER PUBLICATIONS

H.J. Wang, R.H. Katz, et al., "Policy-Enabled Handoffs Across Heterogeneous Wireless Networks," WMCSA 1999 New Orleans, LA.
Q. Zhang, C. Guo, et al., "Efficient Mobility Management for Vertical Handoff between WWAN and WLAN," IEEE Communications Magazine, Nov. 2003.

* cited by examiner

*Primary Examiner*—Duc M. Nguyen
*Assistant Examiner*—Anthony S. Addy
(74) *Attorney, Agent, or Firm*—Bucknam and Archer

(57) ABSTRACT

In this invention, a novel vertical handover control algorithm, consisting of a throughput-based mapping function, QoS-based dynamic handover thresholds, and performance-based trigger timers, are proposed to resolve uncommon pilot problem, QoS requirements, and ping-pong effects, respectively. An analytic model based on a finite state machine is developed to evaluate the proposed algorithm in terms of the handover frequency and achievable throughput. A numerical analysis is also provided to further quantify the performance impacts.

3 Claims, 3 Drawing Sheets

VERTICAL HANDOVER CONTROL ALGORITHM FOR WLAN AND UMTS

BACKGROUND OF THE INVENTION

1. Field of the Invention

This invention relates to a vertical handover control algorithm, especially a vertical handover control algorithm for integrated WLAN and UMTS system, which consists of a throughput-based mapping function, QoS-based dynamic handover thresholds, and performance-based trigger timers for improving the transmission throughput of non-real-time services and substantially reducing the packet loss rate of the real-time services by reducing the vertical handover frequency.

2. Discussion of Related Art

The wireless local area network (WLAN) has been standardized in the IEEE 802.11. It is characterized by high-speed transmission (up to 54 Mbps) and low deployment cost. On the other hand, with higher deployment cost, the third generation wireless system, Universal Mobile Telecommunications System (UMTS), has the advantage of a wider coverage but lower transmission rates (up to 384 kbps outdoor and 2.3 Mbps indoor). The complementary characteristics between the mobility and data rates of these two systems make the integrated WLAN and UMTS system essential to future wireless systems. To establish this new heterogeneous wireless network while disregarding inner-network resource management problems, the initial network selection and the vertical handover control between networks are also critical. In vertical handover, there are three design challenges: (1) no common pilot, (2) QoS support between networks, and (3) ping-pong effect.

Several aspects of the vertical handover algorithms have been investigated for solving those challenges. Due to the lack of standard for vertical handover between UMTS and WLAN systems, those studies and proposed schemes have different considerations and principles for designing this integrated system. That causes deficiency of complete and exact methods suiting for the integrated systems; for example, some may focus on the network layer design while some may pay attention to physical study. Most important, those studies usually consider the different characteristics for UMTS and WLAN systems only and skip the QoS control for achieving different applications' requirements.

Referring to US Patent Publication No. 20040067754, "System and Method for Supporting Quality of Service in Vertical Handovers between Heterogeneous Networks", a system and a method have been disclosed to support vertical handover between heterogeneous networks, which is characterized by establishing handover paths to accommodate a plurality of QoS properties. In this method, several block units are utilized to make up the vertical handover procedure, where each block handles the individual works; however, the relationship between each block are ignored, which may cause the degradation of the QoS performance for different requirements. Also, the frequency of the signal transmission and the overhead may be higher due to the numerous blocks and will degrade the real-time services affected by the delay issues. Besides, this invention focuses on the designs of the network layer (upper layer) but regardless of the physical layer (RF condition, throughput performance, mobile speed, etc).

US Patent Publication No. 20040076179, "Hybrid UMTS/WLAN Telecommunication System", has proposed a system in which an interface or an inter-working unit (IWU) is coupled to the radio network controller (RNC) of a 3GPP/UMTS-type system. In this design, however, the controls consider only the load condition for WLAN system but omit the QoS issues, and the procedure for making decisions after RNC receiving the report from IWU is not specified either. This application only provides a rough concept and lacks substantial technical contents, which thus is difficult to implement.

"Policy-Enabled Handoffs Across Heterogeneous Wireless Networks" by Z. H. J. Wang, R. H. Katz, and J. Giese, WMCSA, 1999, also describes a policy-enabled handoff system which allows users to express policies on what is the "best" wireless system at any moment, and make trade-offs among network characteristics such as cost, performance and power consumption. However, this invention only considers the system characteristics without any services, and the bandwidth measurements and quantifications are different for different systems thus cannot be directly used as a comparable value due to the heterogeneous network environment.

So those desired algorithms cannot achieve the goal of the integration (support users the higher QoS environment with all kinds of services). This is the current defect for designing the related schemes for this area.

SUMMARY OF THE INVENTION

Due to the deficiency of complete and exact method for the integrated systems, a novel vertical handover control algorithm for use in between the WLAN and UMTS systems is proposed. In this invention, there are three major functions included, which are:

A. Throughput-based mapping function—this function can provide a comparable value based on the actual throughput performance for making the handover decisions.
B. QoS-based dynamic handover thresholds—it adjusts the handover trigger to suit for all kinds of the services, which allows users to enjoy the best quality.
C. Performance-based trigger timer—it sets the length of trigger timer to make the handover worthwhile even the ping-pong effect occurs.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

This vertical handover algorithm is composed by three related schemes and the functions of those schemes are stated as follows:

A. Throughput-based mapping function

Figure 1:
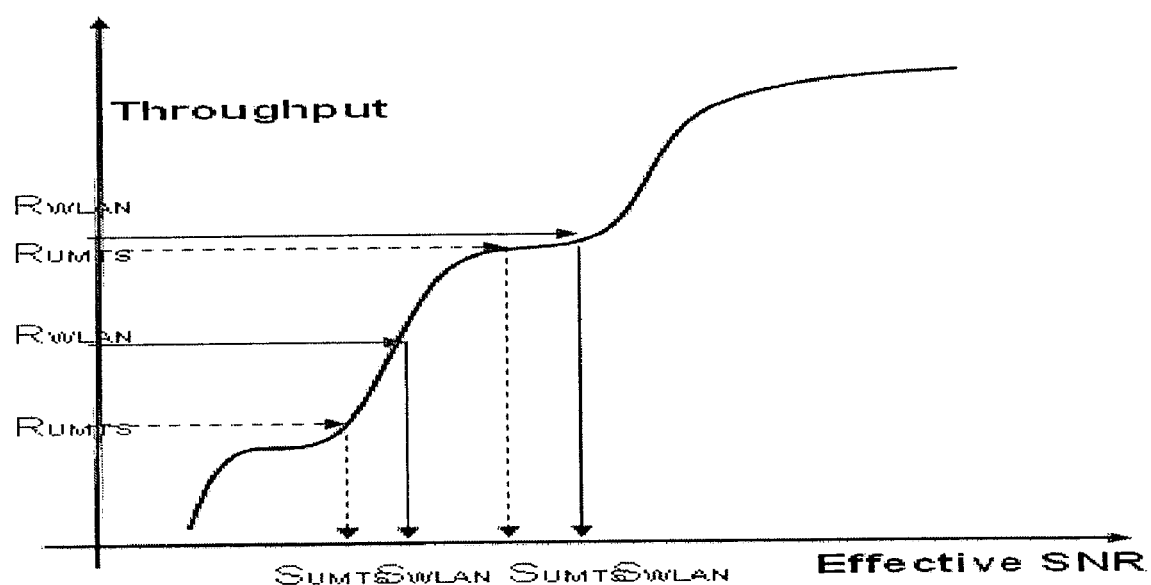
FIG. 1 shows the mapping relationship between the throughput and effective SNR in WLAN system including link adaptation according to present invention.

Referring to FIG. 1, based on a WLAN performance curve, a mapping between the achievable rates from UMTS and WLAN, $R_{UMTS}$ and $R_{WLAN}$, and the corresponding effective SNR values, $S_{UMTS}$ and $S_{WLAN}$ can be identified. In short, the original SNR measurements are first used to estimate the achievable throughput. Through the mapping module, the corresponding effective SNR, $S_{WLAN}$ and $S_{UMTS}$, are calculated based on a WLAN performance curve. A dynamic vertical handover control algorithm can then be derived based on the effective SNR.

Basically, the vertical handover is triggered when the differences between the $S_{WLAN}$ and $S_{UMTS}$ values exceed or drop below a threshold, H for a period of time. As stated in Eq. (1), the downlink handover from UMTS to WLAN is triggered when the effective SNR from WLAN is greater than that of the UMTS by H for $\Delta T_{downlink}$ seconds. From Eq. (2), for the WLAN to UMTS handover, the uplink handover is triggered when the effective SNR from the UMTS is greater than that from the WLAN by H for $\Delta T_{uplink}$ seconds, where the threshold, H and the trigger timer $\Delta T_{downlink/uplink}$ could be a function of QoS requirements.

$$S_{WLAN} - S_{UMTS} > H \text{ for } \Delta T_{downlink} \quad (1)$$

$$S_{WLAN} - S_{UMTS} < H \text{ for } \Delta T_{uplink} \quad (2)$$

B. QoS-based dynamic handover threshold

To reflect the benefit of the vertical handover in various aspects, besides the effective SNR values, the algorithm needs to consider dynamic thresholds and the associated timers to achieve the QoS requirements. In the proposed vertical handover algorithm, the dynamic threshold, H, will depend on service types of non-real time services or real-time services. For non-real-time services, the transmission packets come at a burst and are not sensitive to the delay. In this case, the user transmission rate becomes the priority for the vertical handover. On the other hand, for real-time services, the services have a stringent requirement in the delay bound. Besides, for WLAN-to-UMTS uplink handover, since WLAN has a smaller coverage, the connectivity becomes essential in the uplink handover.

To achieve above design goals, the dynamic threshold is defined as $$H = \alpha - m \times \left(\frac{R_{WLAN}}{R_{UMTS}}\right)_{dB} + n \times \beta + k \times \left(\frac{\Delta + \Delta T_{uplink}}{\Delta}\right)_{dB}, \quad (3)$$

where $\alpha$ and $\beta$ are weighted factors to decide the significance of the associated measurements. $R_{WLAN}$ and $R_{UMTS}$ are the supported data rates from WLAN and UMTS respectively. $\Delta$ is the handover latency (the process delay for a vertical handover). The m, n, and k are values of 0 or 1 which will be decided based on following conditions:

$$m = \begin{cases} 1, & \text{for non-real time services} \\ 0, & \text{otherwise} \end{cases} \quad (4)$$

$$n = \begin{cases} 1, & \text{for real-time services and } \frac{\Delta - D_i}{T_i} > B_i \\ 0, & \text{otherwise} \end{cases}$$

$$k = \begin{cases} 1, & \text{for uplink handover} \\ 0, & \text{otherwise} \end{cases},$$

where $D_i$ is the packet delay bound for application i, $T_i$ is the packet inter-arrival time for application i, and $B_i$ is the maximum allowable burst errors (lost packets) within a time of interest.

Under this design, for non-real-time services, the throughput ratio provides additional weight on the threshold, H, calculations. The dynamic threshold will be decreased if the throughput ratio of WLAN and UMTS becomes larger. This will make the UMTS-to-WLAN handover easier. Thus, a mobile with non-real-time services can achieve higher throughput. For real-time services, besides the over-air-error, the packet loss happens only when the delay bound expires, the excessive handover delay, $\Delta - D_i$, will also cause the loss packets in the real-time services. With the allowable number of lost packets $B_i$ for application i, the number of lost packets due to the vertical handover, $(\Delta - D_i)/T_i$ should be less than $B_i$. If the resulting error performance exceeds $B_i$, the effect of the degradation will be considered in the dynamic threshold, H. To emphasize the connection quality, the weighted factor, $\beta$, as expressed in Eq. (5) will increase proportionally to the increase of the packet loss rates.

$$\beta \propto \ln\left(\frac{\Delta - D_i}{T_i} \Big/ B_i\right) \quad (5)$$

Finally, a timer hysteresis, $T_{uplink}$, is considered to avoid the ping-pong effect. However since the coverage in WLAN is small, any excessive delay might result in the discontinuity of the connection. To resolve this potential problem, the dynamic threshold, H, will include $(\Delta + \Delta T_{uplink})/\Delta$ for an earlier uplink handover trigger if the time hysteresis $T_{uplink}$ is larger.

C. Performance-based trigger timer

The objective of the trigger timer is to resolve the ping-pong effect. In the proposed algorithm, a performance-based trigger timer is used to control the ping-pong effect in which the length of the trigger timer depends on whether the resulting performance can be improved after the handover.

Figure 2:
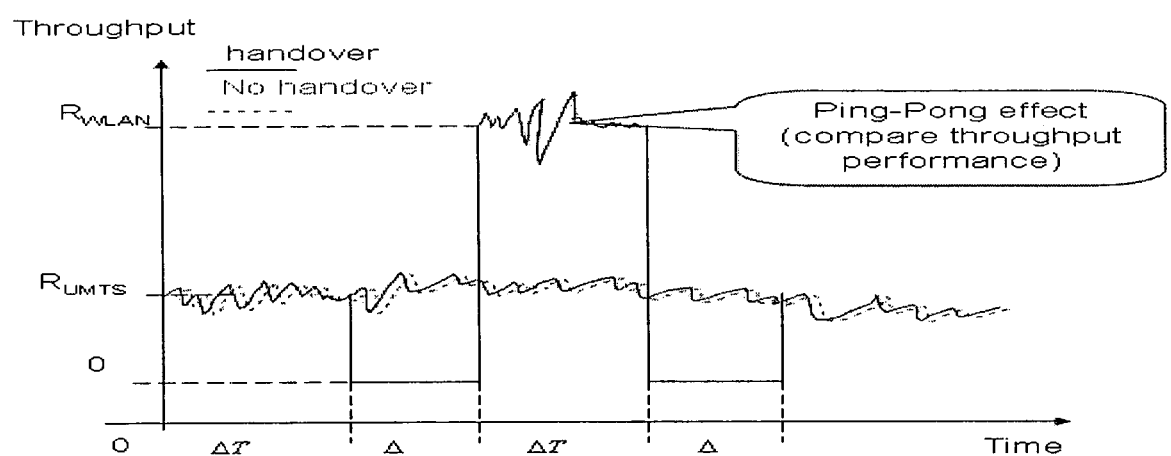
FIG. 2 shows the trigger time functionality for downlink handover according to present invention.

To determine the vertical handover trigger timer, as shown in FIG. 2, the following equation is used:

$$\int_{\Delta + \Delta T}^{\Delta + 2\Delta T} R_{WLAN}(t)dt > \int_{\Delta T}^{2\Delta + 2\Delta T} R_{UMTS}(t)dt \quad (6)$$

From Eq. (6), the handover from UMTS to WLAN is worthwhile only when the user can transmit more data in WLAN than that in the UMTS after the handover process is finished.

To calculate the downlink handover timer, $\Delta T_{downlink}$, it is assumed that the $R_{WLAN}$ and $R_{UMTS}$ are stable during this handover period. In this case, the timer $\Delta T_{downlink}$ is calculated in Eq. (7):

$$\Delta T_{downlink} \geq \frac{2\Delta}{r - 1}, \quad r = \frac{R_{WLAN}}{R_{UMTS}} \quad (7)$$

The same argument can apply to the uplink handover timer calculation. The uplink handover is worthwhile when Eq. (8) is satisfied:

$$\int_{\Delta+\Delta T}^{\Delta+2\Delta T} R_{UMTS}(t)dt > \int_{\Delta T}^{2\Delta+2\Delta T} R_{WLAN}(t)dt \quad (8)$$

The uplink handover timer, $\Delta T_{uplink}$, is calculated by Eq. (9).

$$\Delta T_{uplink} \geq \frac{2\Delta}{1-\frac{1}{r}}, \quad r = \frac{R_{WLAN}}{R_{UMTS}} \quad (9)$$

The handover timers are not fixed and will be updated based on the value r from time to time.

Figure 3:
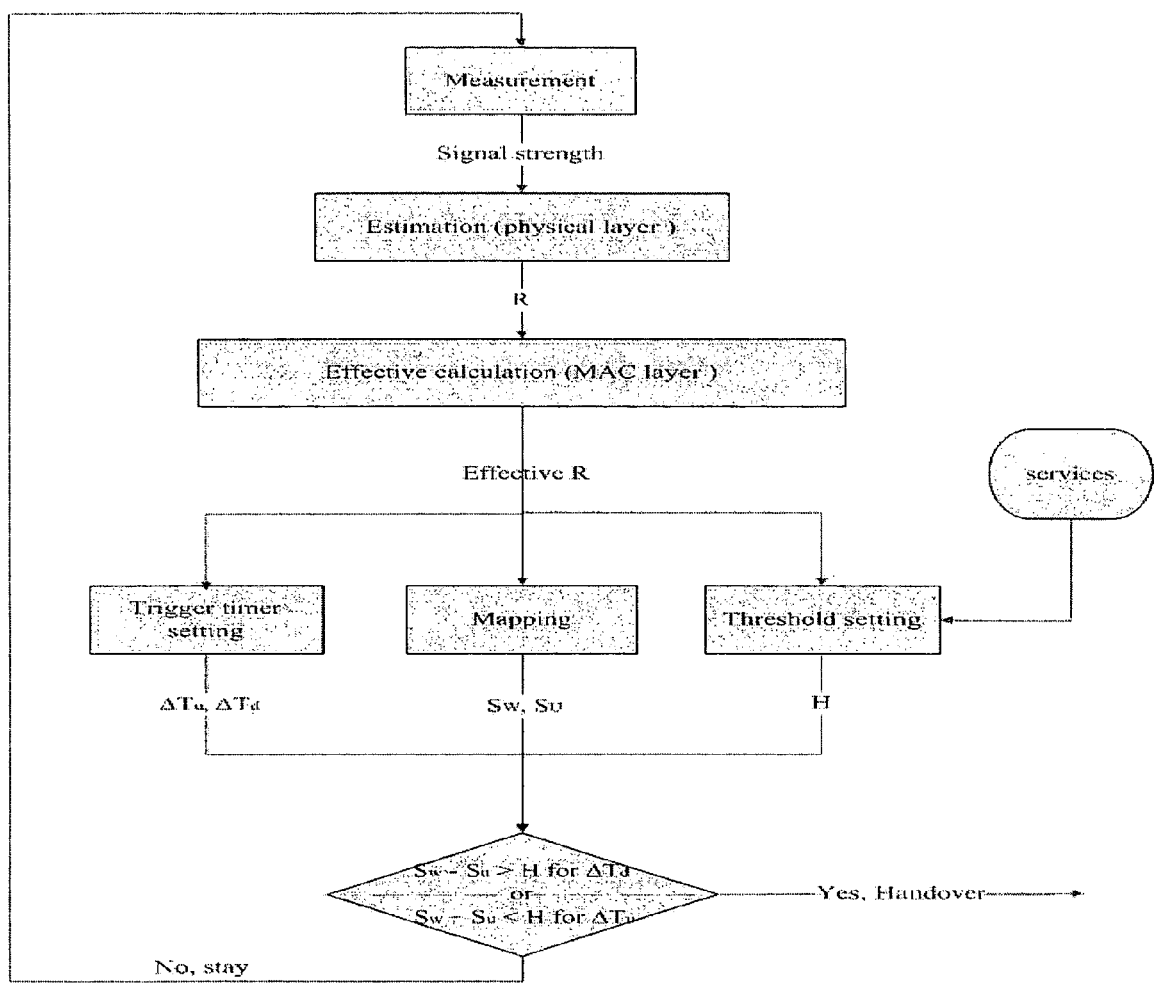
FIG. 3 shows the proposed vertical handover procedure.

To sum up, the total procedure based on three above schemes for the handover control between UMTS and WLAN systems is specified in FIG. 3.

What is claimed is:

1. A method for making handover decisions between UMTS and WLAN systems, comprising the steps of:
   a) obtaining a signal strength measurement for estimating a throughput performance;
   b) using the estimated throughput performance to create a comparable SNR value;
   c) dynamically adjusting a handover threshold H to effectively control a handover trigger according to different applications, wherein the dynamic handover threshold is defined as $$H = \alpha - m \times \left(\frac{R_{WLAN}}{R_{UMTS}}\right)_{dB} + n \times \beta + k \times \left(\frac{\Delta + \Delta T_{uplink}}{\Delta}\right)_{dB}, \text{ where}$$

$$m = \begin{cases} 1, & \text{for non-real time services} \\ 0, & \text{otherwise} \end{cases},$$

$$n = \begin{cases} 1, & \text{for real-time services and } \frac{\Delta - D_i}{T_i} > B_i \\ 0, & \text{otherwise} \end{cases},$$

$$k = \begin{cases} 1, & \text{for uplink handover} \\ 0, & \text{otherwise} \end{cases},$$

where $\alpha$ and $\beta$ are weighted factors to decide significance of associated measurements, $R_{WLAN}$ and $R_{UMTS}$ are supported data rates from WLAN and UMTS respectively, $\Delta$ is handover latency, $D_i$ is a packet delay bound for application i, $T_i$ is a packet inter-arrival time for application i, and $B_i$ is a maximum allowable burst error within a time of interest; wherein the handover threshold H will be undated every sampling time;

d) using set trigger timers $\Delta T_{downlink}$, $\Delta T_{uplink}$ to avoid a ping-pong effect and making the handover decisions worthwhile even when the ping-pong effect happens, wherein the trigger timers for downlink handover and uplink handover are defined as $$\Delta T_{downlink} \geq \frac{2\Delta}{r-1}, \quad r = \frac{R_{WLAN}}{R_{UMTS}},$$

$$\Delta T_{uplink} \geq \frac{2\Delta}{1-\frac{1}{r}}, \quad r = \frac{R_{WLAN}}{R_{UMTS}},$$

where $\Delta$ is the handover latency and the trigger timers will be undated every sampling time; and e) creating two equations which combine steps b, c and d to make handover decisions between UMTS and WLAN systems.

2. The method according to claim 1, wherein the comparable SNR value is defined as effective SNR value ($S_{UMTS}$, $S_{WLAN}$), which represents an SNR value required to achieve throughput performance in the same system environment.

3. The method according to claim 1, wherein the downlink handover and uplink handover are triggered by the following equations:

$$S_{WLAN} - S_{UMTS} > H \text{ for } \Delta T_{downlink},$$

$$S_{WLAN} - S_{UMTS} < H \text{ for } \Delta T_{uplink}.$$

* * * * *